United States Patent
Wittmaak, Jr. et al.

(10) Patent No.: US 9,227,738 B2
(45) Date of Patent: Jan. 5, 2016

(54) AUTOMATED DIAGNOSTIC INSPECTION OF MECHANICAL CONTROLS

(71) Applicant: BELL HELICOPTER TEXTRON INC., Forth Worth, TX (US)

(72) Inventors: John R. Wittmaak, Jr., Newark, TX (US); Jayme Gonzalez, North Richland Hills, TX (US); Charles Eric Covington, Colleyville, TX (US); Carlos Fenny, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 57 days.

(21) Appl. No.: 13/731,974

(22) Filed: Dec. 31, 2012

(65) Prior Publication Data

US 2014/0188332 A1  Jul. 3, 2014

(51) Int. Cl.
*B64F 5/00* (2006.01)
*G05B 23/02* (2006.01)

(52) U.S. Cl.
CPC .......... *B64F 5/0045* (2013.01); *G05B 23/0256* (2013.01)

(58) Field of Classification Search
CPC ...... B64F 5/00; B64F 5/0045; G05B 23/0256
USPC ............ 701/2, 3, 29.1, 29.9, 31.5, 31.9, 33.7, 701/33.8, 33.9, 34.4
See application file for complete search history.

(56) References Cited

U.S. PATENT DOCUMENTS

| 4,274,438 | A | * | 6/1981 | La Coste | 137/551 |
| 4,782,292 | A | * | 11/1988 | Gilfoy et al. | 324/73.1 |
| 2009/0192659 | A1 | | 7/2009 | Beebe | |
| 2009/0222124 | A1 | * | 9/2009 | Latwesen | 700/110 |
| 2010/0076716 | A1 | | 3/2010 | Quitmeyer | |

OTHER PUBLICATIONS

European Search Report dated Mar. 19, 2013 from counterpart EP App. No. 13155319.0.
Office Action dated Dec. 12, 2014 from Counterpart CA App. No. 2,837,629.
European Office Action dated Feb. 12, 2015 from Counterpart EP App. No. 13155319.0.
Office Action dated Jun. 1, 2015 from Counterpart CA App. No. 2,837,629.
Summons to Oral Proceedings dated Aug. 20, 2015 from Counterpart EP App. No. 13155319.0.

* cited by examiner

*Primary Examiner* — Kim T Nguyen
(74) *Attorney, Agent, or Firm* — James E. Walton (57) ABSTRACT

A system and method to diagnosis an actuator of a flight control system. The system and method includes interfacing a diagnostic computer to the flight control system, commanding movement of an actuator with the diagnostic computer via the flight control system, measuring performance of the actuator via the diagnostic computer, and comparing the measured performance of the actuator with allowable performance values.

4 Claims, 6 Drawing Sheets

AUTOMATED DIAGNOSTIC INSPECTION OF MECHANICAL CONTROLS

BACKGROUND

1. Field of the Invention

The present application relates generally to diagnostic systems, and more specifically, to a diagnostic system for mechanical flight controls.

2. Description of Related Art

Conventional aircraft include control systems that require regular inspections to verify proper functionality and structural integrity. The inspection process requires a skilled mechanic to remove multiple panels and other operably associated structures and devices to gain access to the flight control system components. Typical inspections are very time consuming and put the aircraft at risk of foreign object damage/debris during the disassembly and reassembly process.

Current inspection processes include: first, disassembling the aircraft to expose the flight control components; second, performing a visual inspection of the components, thus checking for structural integrity and functionality; replacing any damaged components; and then reassembling the aircraft.

Although great strides have been made in the field of aircraft diagnostic procedures, considerable shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the system and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The diagnostic system of the present application overcomes the problems commonly associated with conventional diagnostic procedures to repair damaged aircraft flight control components. Specifically, in the contemplated embodiment, the system utilizes the existing flight control system to check proper functionality and structural integrity of the components without the need for low fidelity visual inspection, disassembly, and the risk of foreign object damage. Thus, the system greatly reduces maintenance costs, aircraft down time, and the need for a highly skilled mechanic for the diagnosis process. Also, the system increases aircraft safety, dispatch confidence, profitability, and reliability without increasing aircraft weight or cost and the need for additional sensors. Further detailed description of these features is provided below and illustrated in the accompanying drawings.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 1:
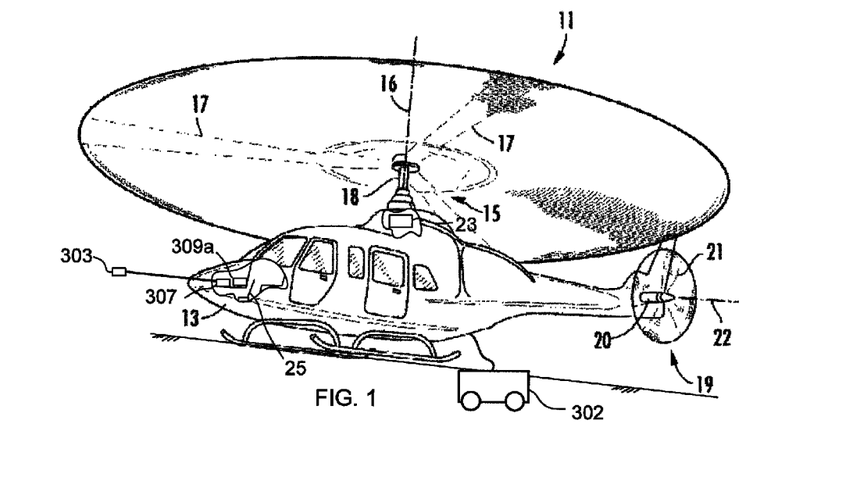
FIG. 1 is a perspective view of a helicopter according to the present application.

Referring now to the drawings wherein like reference characters identify corresponding or similar elements throughout the several views, FIG. 1 shows a helicopter 11 according to a preferred embodiment of the present application. Helicopter 11 comprises a fuselage 13 and a main rotor system 15 having main rotor blades 17 and a main rotor shaft 18. Helicopter 11 also includes a tail rotor system 19 with tail rotor blades 21 and a tail rotor shaft 20. Main rotor blades 17 generally rotate about a vertical axis 16 of main rotor shaft 18, while tail rotor blades 21 generally rotate about a lateral axis 22 of tail rotor shaft 20.

Figure 2:
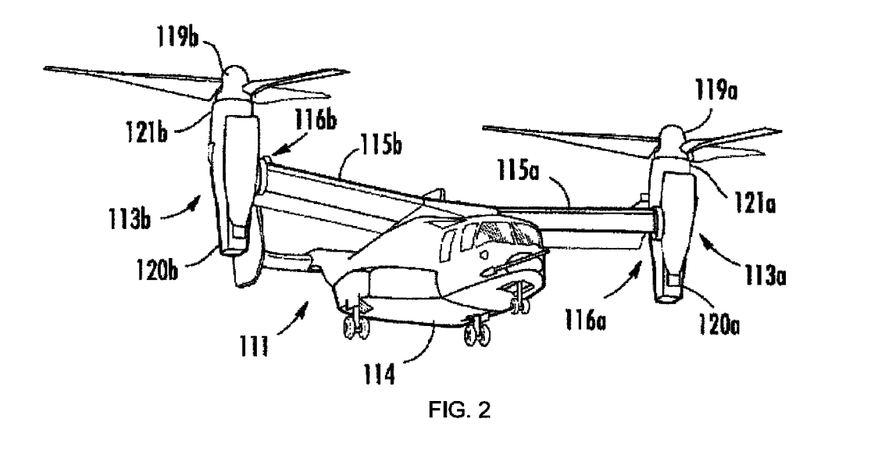
FIG. 2 is a perspective view of a tilt rotor aircraft according to the present application.

Although shown associated with a helicopter, it will be appreciated that the system of the present application may also be used with different types of aircraft or vehicles. For example, FIG. 2 illustrates a tiltrotor aircraft 111 having the system in accordance with the present application.

As is conventional with tiltrotor aircraft, rotor assemblies 113*a* and 113*b* are carried by wings 115*a* and 115*b*, and are disposed at end portions 116*a* and 116*b* of wings 115*a* and 115*b*, respectively. Tilt rotor assemblies 113*a* and 113*b* include nacelles 120*a* and 120*b*, which carry the engines and transmissions of tilt rotor aircraft 111, as well as, rotor hubs 119*a* and 119*b* on forward ends 121*a* and 121*b* of tilt rotor assemblies 113*a* and 113*b*, respectively. Tilt rotor assemblies 113*a* and 113*b* move or rotate relative to wing members 115*a* and 115*b* between a helicopter mode in which tilt rotor assemblies 113*a* and 113*b* are tilted upward, such that tilt rotor aircraft 111 flies like a conventional helicopter; and an airplane mode in which tilt rotor assemblies 113*a* and 113*b* are tilted forward, such that tilt rotor aircraft 111 flies like a conventional propeller driven aircraft.

Figure 3:
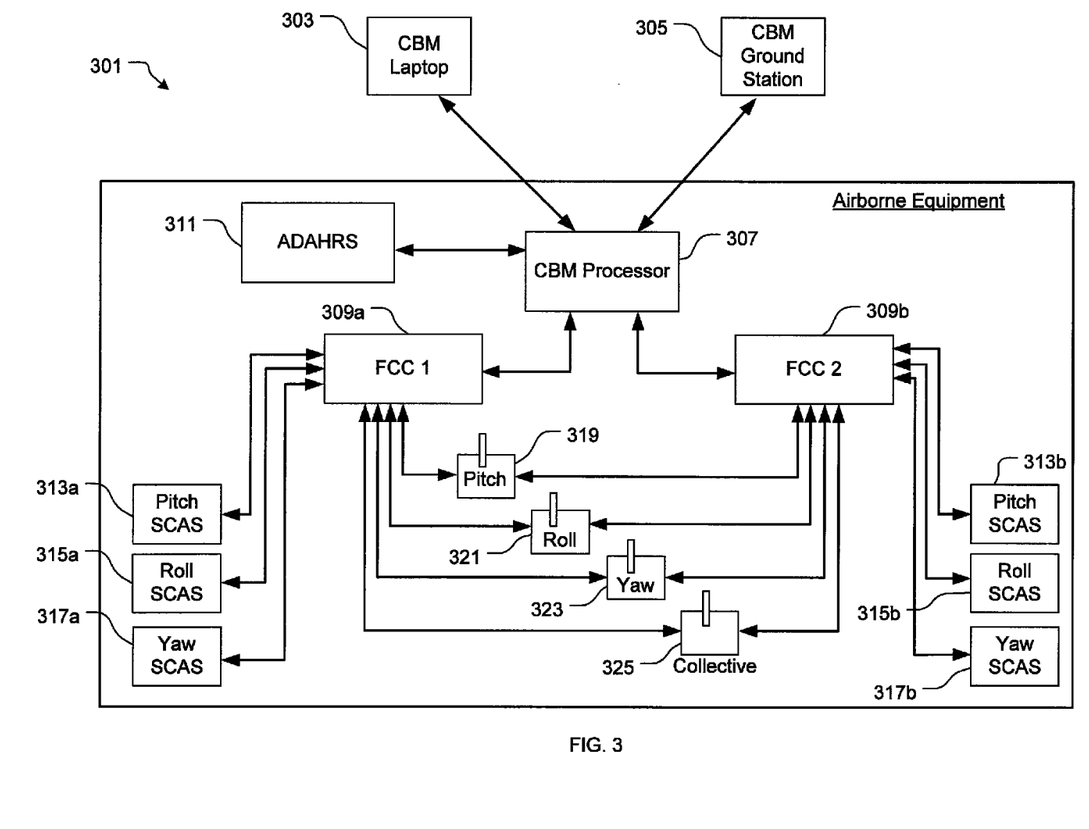
FIG. 3 is schematic of a diagnostic system according to a preferred embodiment of the present application.

FIG. 3 depicts a schematic view of a system 301 in accordance with a preferred embodiment of the present application. In the contemplated embodiment, system 301 utilizes the existing automatic flight control system (AFCS) actuators and/or other control devices, for example, an actuator 23 associated with the rotor system 15, to exercise the mechanical controls in such a way to provide measurements such as position and force. A processor of system 301 then uses algorithms specific to the aircraft to compute values such as control stiffness, travel, backlash friction and overall friction, which are then compared against already determined thresholds to provide pass/fail results. Based upon the output, the mechanic repairs the damaged component accordingly. Further detailed description of these features is provided below.

System 301 preferably comprise of an external computer, which in the exemplary embodiment is either a portable condition based monitor (CBM) computer 303 and/or a CBM ground station 305, both being configured to interface and communicate with the aircraft equipment, namely, a CBM processor 307 operably associated with the existing flight control computers 309a, 309b. For ease of understanding, a plurality of arrows are used to depict the interfacing and communication among the various devices of system 301.

As shown, CBM processor 307 is also operably associated with an air data/attitude heading reference system (ADAHRS) 311 that receives surrounding weather conditions, thus allowing the aircraft to be tested under a technical readiness level (TRL) of 6, which states that the technology be prototyped and tested in a relevant environment.

In the simplified schematic, FCC 309a, 309b are shown operably associated with a plurality of stability and control augmentation systems (SCAS), namely, pitch SCAS 313a, 313b, roll SCAS 315a, 315b, yaw SCAS 317a, 317b, along with devices for pitch 319, roll 321, yaw 323, and collective 325.

It should be understood that one unique feature believed characteristic of system 301 is to interrogate the aircraft's mechanical flight controls by commanding existing Automatic Flight Control System (AFCS) components, i.e., SCAS 313a and device 319, to perform specific tests and report data back to CBM laptop 303 and/or control station 305, which in turn makes an assessment of the mechanical controls based on algorithms developed for the specific aircraft model. It will be appreciated that this functionality is to be added to the aircraft system without adding additional components with the exception of the CBM processor 307.

Three key characteristics are interrogated by system 301, in particular, including, but not limited to: running friction, breakout friction, and backlash of the AFCS components. By monitoring the friction and backlash, system 301 can determine when unacceptable conditions exist, for example, seized bearings, loose bolts, interferences, or improperly installed components (not shown).

It is contemplated utilizing system 301 as a maintenance tool during scheduled/unscheduled maintenance or as a preflight check that the pilot initiates in order to evaluate the operating condition of the aircraft flight controls. It should be understood that as a maintenance tool, the friction test requires that the controls to be swept through their entire motion. For this to occur, at least one of the two hydraulics systems of aircraft 11 must be pressurized. In the contemplated embodiment, there exist two methods to pressurize the hydraulics system; the first being a ground cart, for example a ground cart 302 (see, FIG. 1), or when the aircraft engines are running, for example during preflight and/or flight conditions.

During maintenance inspections, the ground cart 302 is a viable option for conducting friction testing. It should be understood that as rotors turn, the controls cannot be moved at large displacements due to rotor coning restrictions and rotor-structure contact risks. Thus, generally it is considered a maintenance action to utilize a hydraulic ground cart; not a preflight activity.

The maintenance check is implemented using several different methodologies and with different levels of automation. For the purposes of simplification and ease of integration, the impact to existing aircraft components will be minimized so that flight control computer software changes are not required or kept to a minimal.

Figure 4:
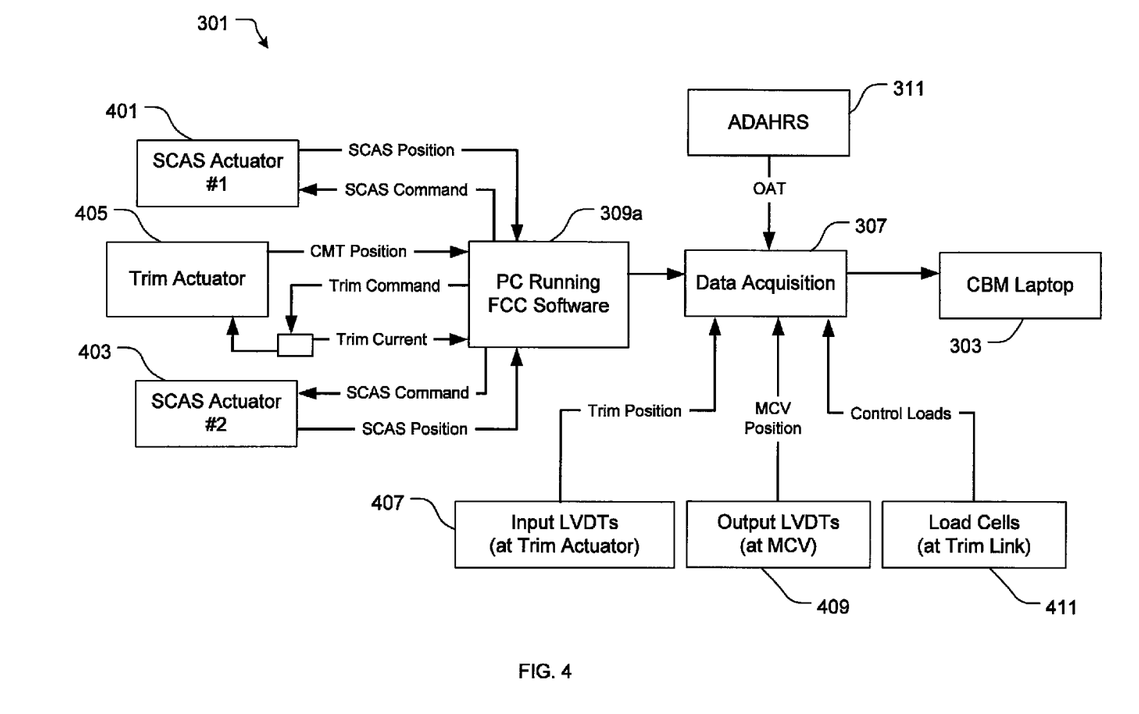
FIGS. 4-8 are schematics view of the diagnostic system of FIG. 3.

FIG. 4 is a schematic view of the data acquisition process of system 301. In particular, the FCC computer 309a is shown operably associated with three actuators, namely, actuator 401, 403, and 405. It will be appreciated that these actuators can be one or more of the different types of SCAS devices discussed above and/or other similarly suitable devices. During the diagnosis process, the FCC computer 309a sends SCAS commands to both actuators 401 and 403, which in turn return SCAS data information. FCC computer 309a also sends a trim command to actuator 405, which in turn responds with the control motion transducer (CMT) position and the trim current. Thereafter, the measured data from FCC computer 309a is sent to CBM processor 307 along with data from the input linear variable differential transformer (LVDT) data at the trim actuator, indicated by box 407, the output LVDT at the main control valve (MCV), indicated by box 409, the control loads from the control cells at the trim link, indicated by box 411, and the outside air temperature (OAT) from ADAHRS 311. The CBM laptop 303 or control station 305 interfaces with CBM processor 307 for acquiring the above data, which in turn is analyzed via one or more algorithms discussed below.

Figure 5:
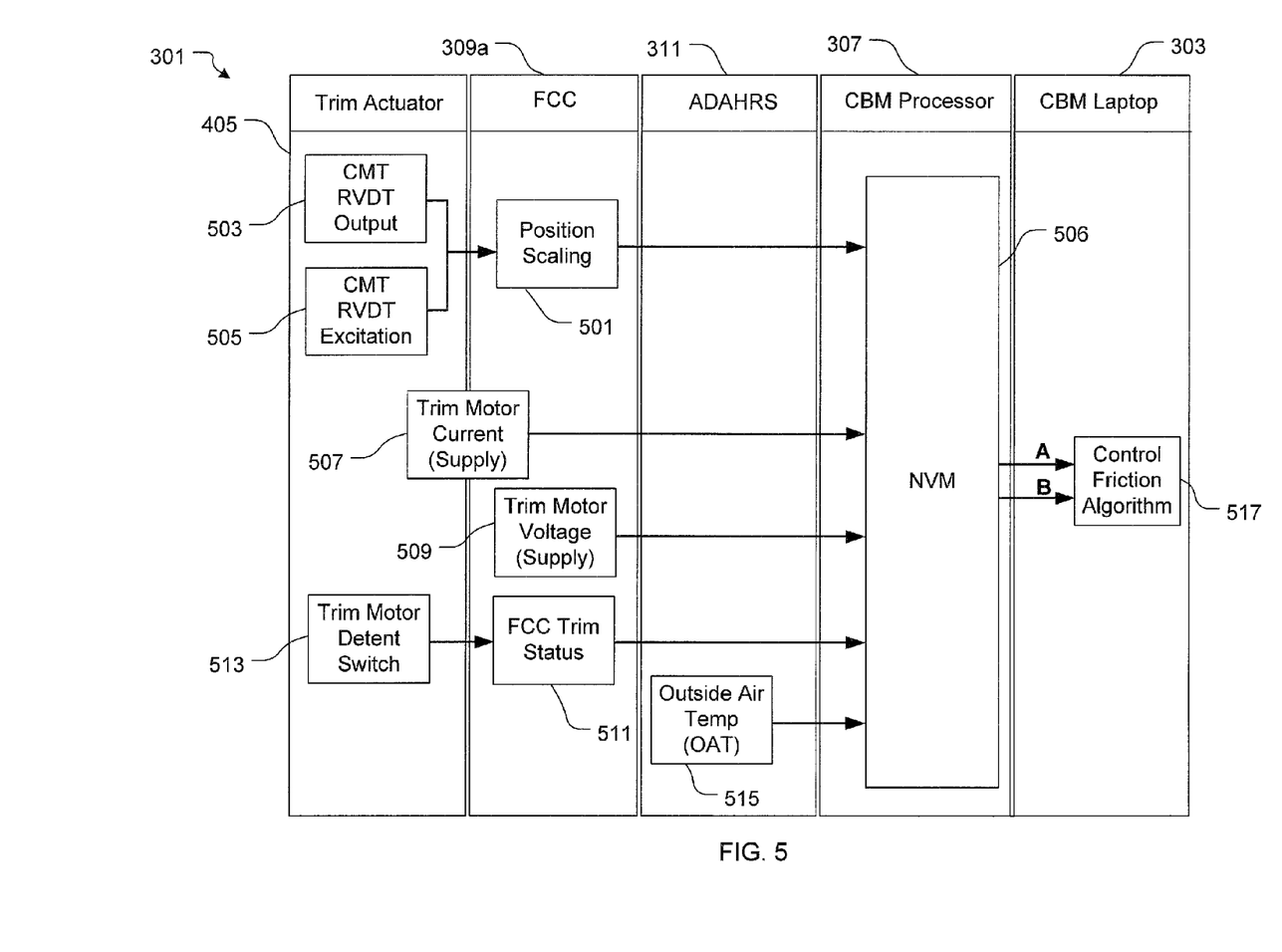
Figure 6:
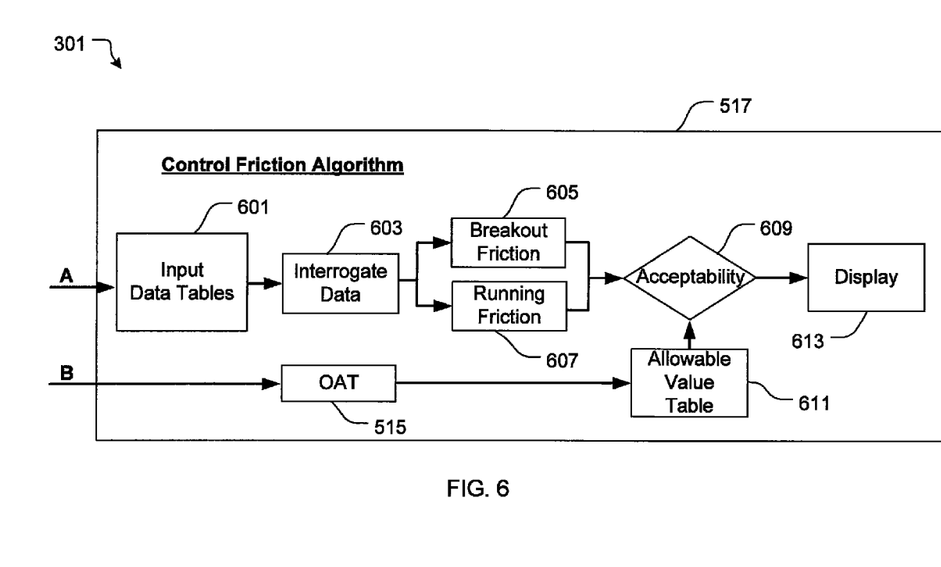
Figure 7:
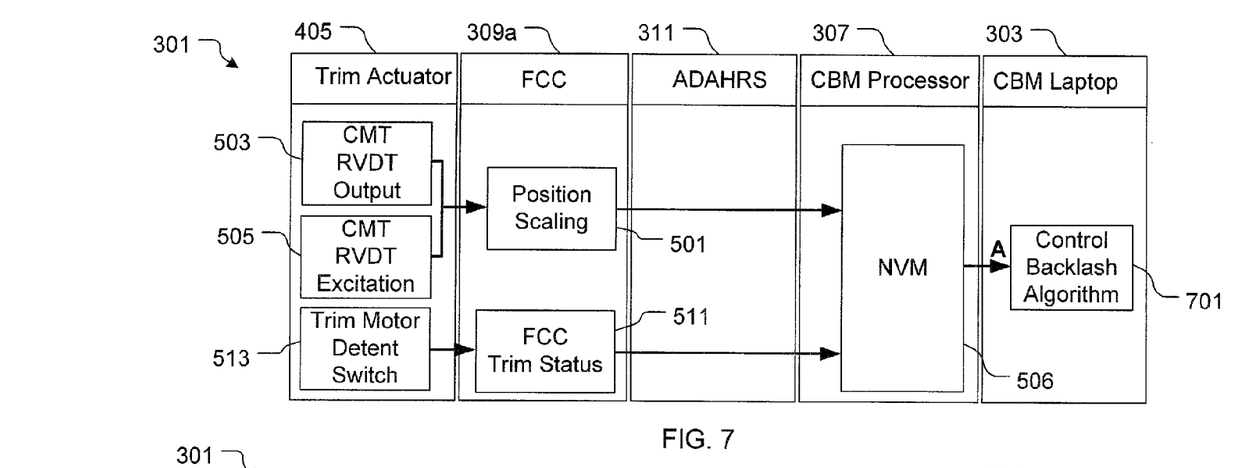
Figure 8:
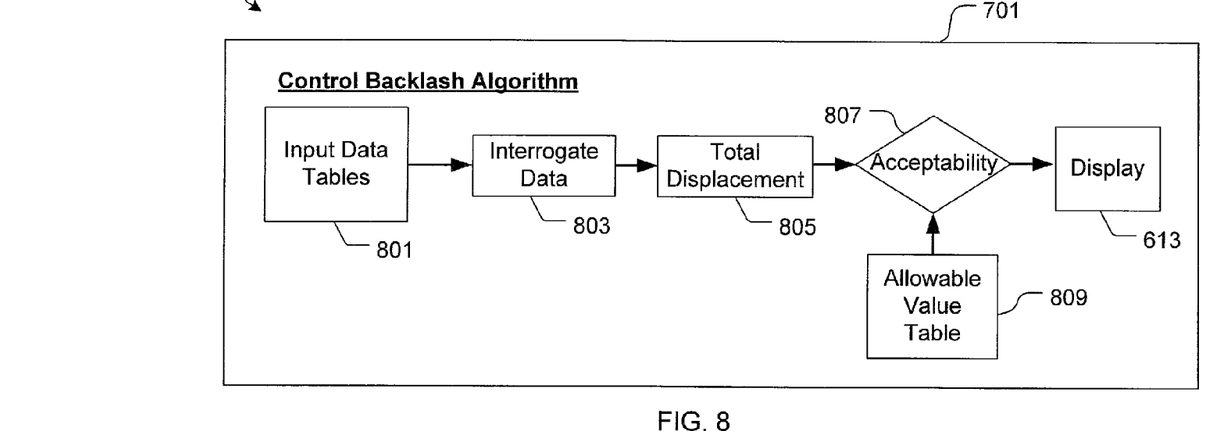

Referring now to FIGS. 5-8 in the drawings, various schematic views of the control architecture of system 301 are shown. FIGS. 5 and 6 illustrate the process to determine control friction, while FIGS. 7 and 8 illustrate the process to determine backlash.

As depicted in FIGS. 5 and 6, the maintenance check for a friction test is conducted as follows: First, the maintainer (also interchangeably referred to as the inspector, worker, and mechanic) dials off the friction adjustments for three controls (Cyclic, Collective, and Directional), for example, stick 25 (see, FIG. 1) of aircraft 11; second, the maintainer provides the aircraft's hydraulic system (not shown) with hydraulic pressure via ground cart 302; third, the maintainer provides the aircraft's electrical system (not shown) with electrical power via ground cart 302; fourth, the Maintainer powers up the aircrafts AFCS system, i.e., FCC 309a and any other required systems, and thereafter interfaces the aircraft into the CBM Ground Station 305 or CBM portable computer 303, i.e., a laptop; fifth, the Maintainer centers all controls; sixth, the Maintainer then initiates the friction test, as depicted in FIG. 5 from the CBM Ground Station 305 or CBM Laptop 303; seventh, the CBM Ground Station 305 or CBM computer 303 provides test commands to the Trim Actuator 405 (via FCC or directly); eighth, the CBM ground station 305 or CBM laptop 303 analyzes the data to determine the friction within the controls system, for example, the Trim Actuator's current-draw and CMT Position data is interrogated and values for Breakout Friction and Running Friction are derived; and lastly, the CBM system compares the values with stored acceptable values and notifies the Maintainer of both acceptable conditions and unacceptable conditions, for example, Force vs. Displacement plots are provided to the Maintainer via the CBM Ground Station or CBM Laptop.

The seventh step discussed above includes the process of: first, drive one trim actuator at a time, in particular: begin at "mid-stick" position and sweep in one direction to the kinematic limit (soft limit or detent limit); return to "mid-stick" position, stop controls, and sweep in opposite direction until the Trim Actuator Detents; and from previous position sweep the controls in the opposite direction until the Trim Actuator Detents; second, repeat for each Trim Actuator. It should be appreciated that the process includes the CBM System monitoring the following parameters during each test: CMT position; Trim Actuator current draw; Detent condition; Outside Air Temperature (OAT). With the acquired data, the CBM computer 303 is then able to determine if a component of the aircraft is malfunctioning.

The above-described features are shown in at least FIGS. 5 and 6. As depicted, the FCC 309a determines the position scaling, as indicated by box 501 of trim actuator 405. Specifically, data of the output and excitation of a command motion transducer (CMT) of the rotary variable differential transformer (RVDT) are received by the FCC 309a to determine position scaling, as indicated by box 503 and 505, respectively. The position scaling data is thereafter received by the non-volatile memory (NVM) 506 of the CBM Processor 307. The NVM also receives data of the trim motor current, as depicted in box 507, and the trim motor voltage, as depicted in box 509, of the trim actuator 405. A FCC trim status, as depicted by box 511, is obtained from a trim motor detent switch 513, which data is in turn received by the NVM 506. Finally, the OAT data, as indicated by box 515 is sent to NVM 506.

The CBM laptop 303 (or control station 305) interfaces with the CBM processor 307 for analyzing the above-described data information. The data from the NVM is received by the control friction algorithm 517 of CBM laptop 303.

In FIG. 6, a schematic view of the control friction algorithm 517 is shown. An input table 601 of the above-described data is interrogated, as indicated by box 603, which in turn determines the breakout friction and running friction, as indicated by respective boxes 605 and 607. The OAT data 515 is utilized to determine allowable threshold values, as indicated in box 611, that in turn determines acceptable of the breakout and running friction values, as indicated in box 609. Thereafter, a display 613 is utilized of the maintainer viewing access of whether the breakout and running friction values are acceptable. If not, then the maintainer can further diagnosis and repair the actuator accordingly.

It is also contemplated determining backlash, which includes the process of: first, the maintainer centers the controls via stick 25 or other suitable means; second, the maintainer installs the rig pins (not shown) into the Main Control Valves for each Boost Actuator; third, the maintainer provides the aircraft's electrical system with electrical power via a ground cart; fourth, the maintainer powers up the aircrafts AFCS system, any other required systems, and plugs the aircraft into the CBM Ground Station or CBM Laptop; fifth, the maintainer initiates the Backlash Test from the CBM Ground Station or CBM Laptop; sixth, the CBM Ground Station or CBM Laptop commands the AFCS components to perform test functions on one control axis at a time; seventh, the CBM System compares the difference in positions with stored values that define acceptable levels for that particular control axis; eight, the CBM System notifies the maintainer of all acceptable/unacceptable values.

During the sixth step, it is not known which AFCS components will provide the best results and specifically what test functions are required. Testing will be conducted to identify component capabilities. Regardless what components are used, general test functions are as follows: Drive controls in one direction until actuator detent or shut-down; Reverse direction of actuator until detent or shut-down; and Monitor actuator position and detent condition (shut-down).

Referring specifically to FIGS. 7 and 8, the above-described process for analyzing backlash is shown in schematic views. FIG. 7 illustrates the same process of obtaining data from trim actuator 405 discussed above. Thereafter, the data is received by a control backlash algorithm 701, where it is analyzed and displayed on display 613. FIG. 8 further illustrates the control backlash algorithm process, which includes interrogating the data from an input data table, as depicted in boxes 801 and 803. Thereafter, the total displacement of the trim actuator is determined, as depicted in 805, and that value is compared with the allowable values, as depicted in boxes 807 and 809. Whether the backlash is acceptable is displayed on display 613 for viewing access.

Once the data is completely analyzed the algorithms can be finalized for each of the three control characteristics (Breakout Friction, Running Friction, & Backlash). The algorithms will identify out-of-tolerance conditions and notify the user of the condition. The completed algorithms will be verified using the data captured from the AFCS components during the Seed-Fault Testing. This Technology Demonstration activity will be a "post-process" activity where the test data is fed to the software and the software will identify acceptable or unacceptable control conditions.

This methodology produces the necessary research to determine what AFCS components can accurately monitor control characteristics and identifies the logic required to determine when adverse conditions exist. It conducts the research in such a way as to reduce the number to trips required for testing and is meant to help keep the project within budget. A TRL 6 is achieved because the tests were conducted using actual AFCS components in a realistic environment to collect data and processing the data with prototype software logic.

There are a total of two algorithms: Backlash and Friction. Both algorithms are initiated during maintenance activities and therefore have all, or at least most, of the On-board CBM Processor resources. Therefore, sharing memory and processor resources to other CBM processes is not a concern.

The Control Friction Algorithm and the Backlash Algorithm have different test commands using different AFCS components. The Control Friction Algorithm will require the Trim Actuator to perform specific movements which are conceptually defined in section 2.1. The Backlash Algorithm may be implemented several different ways and will be further defined following phase 1 testing.

Each Algorithm requires signal sampling at a frequency of 50 Hz. Signal data is stored in Non-Volatile Memory (NVM) and marked with a time record. Following each test the signal data that is stored in NVM is transmitted to the CBM Ground Station/Laptop where the algorithms interrogate the data and output the results.

Once the Data Set (Data Tables) is transmitted to the CBM Ground Station or CBM Laptop it is interrogated to identify Breakout Friction and Running Friction. The interrogation process will consist of two parts; one to identify breakout friction and one to identify running friction.

Breakout Friction Identification follows the following steps: first, identify the largest current measurement prior to 4° of CMT rotation—it should be noted that test data may indicate that some form of filtering or averaging is required to cancel out interference or noise; and second, using OAT and Current derive the actuator output force from the Trim Actuator Baseline Lookup Table. This value will be the Control System Breakout Friction.

Running Friction Identification following the following steps: first, average the current measurements after 4° of CMT rotation and before 60° of CMT rotation; and second, using the OAT and Averaged Current derive the actuator output force from the Trim Actuator Baseline Lookup Table. This Value will be the Control System Running Friction.

Trim Actuator Baseline Lookup Table: Inconsistencies in Trim Actuators have been identified. These inconsistencies indicate that any combination of Trim Actuators is not guaranteed to have the same operating characteristics. To mitigate this issue each Trim Actuator must be "baselined" either prior to installation or prior to performing these tests. This baselining activity will create a lookup table for the trim actuator that is used in the mentioned tests. Integration of this technology will require that a means to conduct this baseline test on a trim actuator be provided.

Once the Data Set (Data Tables) is transmitted to the CBM Ground Station or CBM Laptop it is interrogated to identify Control Backlash.

In short, the CBM Ground Station or CBM Laptop receives the Data Tables from the CBM Processor after the test commands are complete. The data consists of position measurements and detent switch conditions. Position measurements near detent identify the extent of control motion. The difference between both positions that occur near detent is Total Displacement of the controls.

Although particular step sequences are shown, described, and claimed, it should be understood that steps may be performed in any order, separated or combined unless otherwise indicated and will still benefit from the present disclosure.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method to diagnosis flight control devices, comprising:
    interfacing a portable computer with an aircraft computer;
    commanding an actuator with the portable computer via a flight control system of the aircraft computer;
    obtaining running friction and breakout friction data of the actuator via the portable computer;
    comparing the running friction and breakout friction data of the actuator with allowable performance data stored in a table in the portable computer;
    obtaining outside air temperature data via the portable computer;
    modifying the allowable performance data according to the outside air temperature data; and
    providing notice if the running friction and breakout friction is outside the allowable performance data.

2. The method of claim 1, wherein the aircraft computer is the flight control system.

3. The method of claim 2, wherein the actuator is a trim actuator.

4. The method of claim 1, further comprising:
    interfacing a processor with the flight control system that in turn interfaces with the portable computer.

* * * * *